United States Patent
Seki et al.

(10) Patent No.: US 10,571,077 B2
(45) Date of Patent: Feb. 25, 2020

(54) COOLED-HYDROGEN SUPPLY STATION AND A COOLING APPARATUS FOR HYDROGEN

(71) Applicant: SHINWA CONTROLS CO., LTD, Kawasaki-Shi (JP)

(72) Inventors: Atsushi Seki, Kawasaki (JP); Katsutoshi Sakai, Kawasaki (JP); Hirofumi Inoue, Kawasaki (JP)

(73) Assignee: Shinwa Controls Co., Ltd., Kawasaki-Shi (JP)

( * ) Notice: Subject to any disclaimer, the term of this patent is extended or adjusted under 35 U.S.C. 154(b) by 28 days.

(21) Appl. No.: 16/070,023

(22) PCT Filed: Jan. 19, 2017

(86) PCT No.: PCT/JP2017/001658
§ 371 (c)(1),
(2) Date: Jul. 13, 2018

(87) PCT Pub. No.: WO2017/126580
PCT Pub. Date: Jul. 27, 2017

(65) Prior Publication Data
US 2019/0032849 A1    Jan. 31, 2019

(30) Foreign Application Priority Data
Jan. 22, 2016   (JP) .................................. 2016-011107

(51) Int. Cl.
*F17C 5/06*  (2006.01)
*F25D 17/02*  (2006.01)
*F25D 29/00*  (2006.01)

(52) U.S. Cl.
CPC ................ *F17C 5/06* (2013.01); *F25D 17/02* (2013.01); *F25D 29/001* (2013.01);
(Continued)

(58) Field of Classification Search
CPC ........... F17C 5/06; F25D 17/02; F25D 29/001
(Continued)

(56) References Cited

U.S. PATENT DOCUMENTS

| | | |
|---|---|---|
| 8,522,834 B2 | 9/2013 | Okawachi |
| 2013/0139996 A1 | 6/2013 | Hashimoto |
| 2015/0345705 A1 | 12/2015 | Seki et al. |

FOREIGN PATENT DOCUMENTS

| | | | |
|---|---|---|---|
| JP | 2007-100906 A1 | 4/2007 | |
| JP | 2013-024287 A1 | 2/2013 | |

(Continued)

OTHER PUBLICATIONS

International Search Report and Written Opinion (Application No. PCT/JP2017/001658) dated Mar. 28, 2017.
(Continued)

*Primary Examiner* — Timothy L Maust
*Assistant Examiner* — James R Hakomaki
(74) *Attorney, Agent, or Firm* — Burr & Brown, PLLC

(57) ABSTRACT

The present invention is a hydrogen cooling apparatus comprising: a air-cooled condenser disposed on a part of a first coolant passage so as to enable cooling of a first coolant by driving an air-cooling fan; a first heat exchanger enabling cooling of a second coolant by the first coolant, between another part of the first coolant passage and a part of a second coolant passage; and a second heat exchanger enabling cooling of hydrogen by the second coolant, between another part of the second coolant passage and a part of a hydrogen passage. A driving rotational speed of the air-cooling fan is inverter controlled in such a manner that a pressure of the first coolant from the air-cooled condenser to the first heat exchanger is maintained between 1.5 MPa and 1.7 MPa.

9 Claims, 6 Drawing Sheets

(52) U.S. Cl.
CPC .............................. *F17C 2221/012* (2013.01); *F17C 2223/0123* (2013.01); *F17C 2225/0123* (2013.01); *F17C 2227/0346* (2013.01); *F17C 2227/0355* (2013.01); *F17C 2227/0388* (2013.01); *F17C 2250/043* (2013.01); *F17C 2250/0439* (2013.01); *F17C 2265/065* (2013.01); *F17C 2270/0184* (2013.01); *F25D 2600/04* (2013.01)

(58) Field of Classification Search
USPC .......................................................... 141/82
See application file for complete search history.

(56) References Cited

FOREIGN PATENT DOCUMENTS

| | | | |
|---|---|---|---|
| JP | 2013-108652 | A1 | 6/2013 |
| JP | 5632065 | B1 | 11/2014 |
| TW | 201225405 | A1 | 6/2012 |
| TW | 201541004 | A | 11/2015 |

OTHER PUBLICATIONS

Taiwanese Office Action (Application No. 105142508) dated May 29, 2018.

FIG.5

| | CONDENSER AIR-COOLING FAN INV FREQUENCY | COMPRESSOR CAPACITY (70~100%) | EEV1 ELECTRONIC-EXPANSION-VALVE OPEN DEGREE | EEV2 HOT-GAS-BYPASSING-VALVE OPEN DEGREE |
|---|---|---|---|---|
| | CONTROL OBJECT: CONDENSER PRESSURE (P5) 1.6MPa TARGET | | CONTROL OBJECT: BRINE SUPPLY TEMPERATURE -40°C TARGET | CONTROL OBJECT: COMPRESSOR SUCTION PRESSURE 0kPa TARGET |
| DURING COOLING 10→-40°C | 57.5Hz | 100% | 50% | 0% |
| DURING IDLING -40°C TEMPERATURE ADJUSTMENT | 32.9Hz | 100% | 20~30% | 50~100% |
| DURING HYDROGEN FILLING -40°C TEMPERATURE ADJUSTMENT | 32.9→57.5Hz | 100% | 50% | 0% |

FIG.6

| | CONDENSER AIR-COOLING FAN INV FREQUENCY CONTROL OBJECT: CONDENSER PRESSURE (P5) 1.6MPa TARGET | COMPRESSOR CAPACITY (70~100%) | EEV1 ELECTRONIC-EXPANSION-VALVE OPEN DEGREE CONTROL OBJECT: BRINE SUPPLY TEMPERATURE -40°C TARGET | EEV2 HOT-GAS-BYPASSING-VALVE OPEN DEGREE CONTROL OBJECT: COMPRESSOR SUCTION PRESSURE 0kPa TARGET |
|---|---|---|---|---|
| DURING COOLING 10→-40°C | 57.5Hz | 100% | 50% | 0% |
| DURING IDLING -40°C TEMPERATURE ADJUSTMENT | 32.9Hz | 70% | 10~15% | 100% |
| DURING HYDROGEN FILLING -40°C TEMPERATURE ADJUSTMENT | 32.9→57.5Hz | 100% | 50% | 0% |

COOLED-HYDROGEN SUPPLY STATION AND A COOLING APPARATUS FOR HYDROGEN

TECHNICAL FIELD

The present invention relates to a cooled-hydrogen supply station configured to supply cooled hydrogen to a fuel cell vehicle or the like, and a cooling apparatus for hydrogen used in the cooled-hydrogen supply station.

BACKGROUND ART

A fuel cell vehicle using hydrogen as a fuel emits no exhaust gas. Thus, such a fuel cell vehicle is environmentally friendly. Under the circumstances, in order to use such a fuel cell vehicle more widely, various developments have been advanced in recent years. In order for prevalence of such a fuel cell vehicle, development of the vehicle itself is important, and development of a hydrogen supply station configured to supply hydrogen to a fuel cell vehicle is also important.

With regard to such a hydrogen supply station, the applicant has already obtained a patent (JP 5632065 B). The hydrogen supply station disclosed by this patent can achieve highly precise and sufficiently highly efficient cooling.

SUMMARY OF INVENTION

In the invention disclosed in JP 5632065 B, a water-cooled refrigeration unit is adopted for cooling the first coolant.

The present inventors have intensively studied the matter of replacing the water-cooled refrigeration unit with an air-cooled condenser that can create cooling effects by driving an air-cooling fan. In addition, the present inventors have intensively studied the matter of achieving energy-saving effects by adopting an inverter control with regard to a driving control of the air-cooling fan.

The present invention has been made based on the above background. The object of the present invention is to provide a cooled-hydrogen supply station that adopts an air-cooled condenser having an air-cooling fan driven in accordance with an inverter control and that is capable of cooling hydrogen with sufficiently high efficiency and, preferably, with high precision, and to provide a hydrogen cooling apparatus used in the cooled-hydrogen supply station.

The present invention is a cooled-hydrogen supply station comprising: a first coolant passage through which a first coolant circulates; an air-cooled condenser disposed on a part of the first coolant passage so as to enable cooling of the first coolant by driving an air-cooling fan; a second coolant passage through which a second coolant flows; a first heat exchanger enabling cooling of the second coolant by the first coolant, between another part of the first coolant passage and a part of the second coolant passage; a pressure detecting sensor configured to detect a pressure of the first coolant from the air-cooled condenser to the first heat exchanger; an inverter controller configured to inverter control a driving rotational speed of the air-cooling fan based on the pressure detected by the pressure detecting sensor in such a manner that the pressure is maintained between 1.5 MPa and 1.7 MPa; a hydrogen storage unit in which hydrogen is stored; a hydrogen passage through which the hydrogen stored in the hydrogen storage unit is transported; and a second heat exchanger enabling cooling of the hydrogen by the second coolant, between another part of the second coolant passage and a part of the hydrogen passage; wherein: the inverter controller is configured to increase the driving rotational speed of the air-cooling fan or maintain the driving rotational speed of the air-cooling fan at a high level thereof while the pressure detected by the pressure detecting sensor is increased or at a high level thereof, and to decrease the driving rotational speed of the air-cooling fan or maintain the driving rotational speed of the air-cooling fan at a low level thereof while the pressure detected by the pressure detecting sensor is decreased or at a low level thereof; the first coolant is flon; the second coolant is potassium formate solution; a flow rate of the second coolant flowing through the second coolant passage is between 135 L/min and 165 L/min at a flow pressure of 0.3 Mpa; the hydrogen is cooled down to a temperature range of between −43° C. and −20° C. by the second heat exchanger; the hydrogen is cooled to a temperature within an error span between +2° C. and −3° C. with respect to a set temperature within the temperature range of between −43° C. and −20° C. by the second heat exchanger; a hydrogen cooling power for cooling hydrogen to −40° C. is between 13.5 kW and 16.5 kW; the hydrogen passage has an outlet port from which the hydrogen having been cooled by the second heat exchanger is discharged; and a flow rate of the hydrogen discharged from the outlet port is between 4.5 kg/3 minutes and 5.5 kg/3 minutes.

According to the cooled-hydrogen supply station developed by the present inventors, since it is achieved that the hydrogen cooling power for cooling hydrogen down to −40° C. is between 13.5 kW and 16.5 kW (between 13.5 kW@−40° C. and 16.5 kW@−40° C.), hydrogen can be cooled with high efficiency, i.e., hydrogen can be cooled in a significantly energy-saving manner.

In addition, the hydrogen is configured to be cooled to a temperature within an error span between +2° C. and −3° C. with respect to a set temperature within the temperature range of between −43° C. and −20° C. by the second heat exchanger. That is, according to the cooled-hydrogen supply station developed by the present inventors, since the cooling precision within an error span between +2° C. and −3° C. with respect to a set temperature within the temperature range of between −43° C. and −20° C. can be achieved, hydrogen can be cooled with sufficiently high efficiency and with high precision.

In addition, in the cooled-hydrogen supply station, the hydrogen passage has an outlet port from which the hydrogen having been cooled by the second heat exchanger is discharged, and that a flow rate of the hydrogen discharged from the outlet port is between 4.5 kg/3 minutes and 5.5 kg/3 minutes. Due to such a discharging flow rate of the hydrogen, supply of the hydrogen to at least one fuel cell vehicle can be completed within 3 minutes (a hydrogen capacity of a current general fuel cell vehicle is 5 kg).

The present inventors have confirmed that, in the cooled-hydrogen supply station, when the first coolant is flon and the second coolant is potassium formate solution, specifically, "cold brine" manufactured by Showa Corporation, the aforementioned respective performances can be realized.

In addition, differently from the invention disclosed in JP 5632065 B, since the air-cooled condenser is adopted instead of the water-cooled refrigeration unit, it is not necessary to use any cooling-water utility equipment. Thus, degree of freedom associated with an installation place is remarkably improved. Furthermore, with regard to the driving control of the air-cooling fan, since the inverter control based on the pressure of the first coolant from the air-cooled condenser to the first heat exchanger is adopted, the desired energy-saving effects and highly precise operation can be achieved.

Specifically, for example, while the pressure detected by the pressure detecting sensor is increased or at a high level thereof (during a high load, for example, during an initial cooling of the first coolant for an initial operation or during a cooling of hydrogen by the second heat exchanger), the driving rotational speed of the air-cooling fan is set at 57.5 Hz. On the other hand, while the pressure detected by the pressure detecting sensor is decreased or at a low level thereof (during a low load, for example, during an idling state), the driving rotational speed of the air-cooling fan is maintained at 32.9 Hz. Thereby, effective energy-saving effects can be achieved, and the condensing pressure of the first coolant is stable within the range of between 1.5 MPa and 1.7 MPa, so that the first coolant can be always used in a stable state thereof (see FIG. 3).

Herein, it is necessary to dispose the air-cooling fan in a state wherein the air-cooling fan is exposed to an outside gas. Thus, the air-cooling fan has to have an explosion-proof type of structure against hydrogen. As an example of the explosion-proof type of structure against hydrogen, there is an improved explosion resistance (safety-increased explosion proof) as an explosion-proof electrical equipment standard which can be used in a danger zone where hydrogen exists.

Specifically, for example, the cooled-hydrogen supply station further comprises: a valve configured to control a circulating rate of the first coolant through the air-cooled condenser; a temperature sensor configured to detect a temperature of the second coolant just after the first heat exchanger in the second coolant passage; and a temperature feedback control unit configured to control the valve based on a detection result of the temperature sensor. In this case, the second coolant can be controlled at a desired temperature with high precision, by a simple temperature feedback control.

To be more specific, when the temperature of the second coolant is higher than −40° C., an open degree of the valve during the operation is 40% or more, and an upper limit thereof is for example 50%. When the temperature of the second coolant is not higher than −40° C., a lower limit of the open degree of the valve during the operation is 10%, and for example the open degree of the valve during the operation is between 20% and 30%. The valve may be an electronic expansion valve, for example.

In a case wherein the first coolant is caused to circulate through the first coolant passage by driving a compressor, when the temperature of the second coolant is not higher than −40° C., it is further preferable that an output power of the compressor is reduced to a range of between 60% and 80%. For example, the output power of the compressor may be reduced to 70%, and the open degree of the valve may be reduced to 12.8%. In this case, preferably, a hot gas bypassing passage that bypasses the air-cooled condenser in the first coolant passage may be further provided, a second valve that controls a circulating rate of the first coolant through the hot gas bypassing passage may be further provided, and an open degree of the second valve may be set at 100%.

In addition, in the cooled-hydrogen supply station, it is preferable that the cooled-hydrogen supply station is operated by selecting any of a first operation mode and a second operation mode, that the hydrogen is cooled to −20° C. in the first operation mode, and that the hydrogen is cooled to −40° C. in the second operation mode.

For example, depending on probability that the hydrogen has to be supplied, if the probability is low, the first operation mode corresponding to an idling operation condition is selected. On the other hand, if the probability is high, the second operation mode corresponding to a standby condition is selected. Thus, consumption of energy for cooling the hydrogen can be efficiently restrained.

For example, the selection of the first operation mode and the second operation mode may be automatically carried out depending on a time zone. In this case, for example, in a nighttime zone where there is a low probability that the hydrogen has to be supplied (e.g., outside business hours), the first operation mode is selected, while in a daytime zone where there is a high probability that the hydrogen has to be supplied (e.g., during business hours), the second operation mode is selected. Thus, in the nighttime zone where there is a less probability that the hydrogen has to be supplied, consumption of energy for cooling the hydrogen can be efficiently restrained.

In addition, in the cooled-hydrogen supply station, the second coolant passage may further include a tank unit; and a coolant-amount regulating mechanism configured to maintain a liquid level of the second coolant in the tank unit within a predetermined range may be connected to the tank unit.

In this case, since the liquid level of the second coolant in the tank unit is maintained within a predetermined range, even if a corrosive liquefied coolant is used as the second coolant and the second coolant expands and/or contracts due to a change in temperature, it is possible to prevent occurrence of corrosion and/or adhesion of precipitates on an inner wall of the tank unit, which might be caused by a rise and fall of the liquid level of the second coolant.

In addition, the present invention is a hydrogen cooling apparatus configured to cool hydrogen transported in a hydrogen passage; the hydrogen cooling apparatus comprising: a first coolant passage through which a first coolant circulates; an air-cooled condenser disposed on a part of the first coolant passage so as to enable cooling of the first coolant by driving an air-cooling fan; a second coolant passage through which a second coolant flows; a first heat exchanger enabling cooling of the second coolant by the first coolant, between another part of the first coolant passage and a part of the second coolant passage; a pressure detecting sensor configured to detect a pressure of the first coolant from the air-cooled condenser to the first heat exchanger; an inverter controller configured to inverter control a driving rotational speed of the air-cooling fan based on the pressure detected by the pressure detecting sensor in such a manner that the pressure is maintained between 1.5 MPa and 1.7 MPa; and a second heat exchanger enabling cooling of the hydrogen by the second coolant, between another part of the second coolant passage and a part of the hydrogen passage; wherein: the first coolant is flon; the second coolant is potassium formate solution; a flow rate of the second coolant flowing through the second coolant passage is between 135 L/min and 165 L/min at a flow pressure of 0.3 Mpa; the hydrogen is cooled down to a temperature range of between −43° C. and −20° C. by the second heat exchanger; the hydrogen is cooled to a temperature within an error span between +2° C. and −3° C. with respect to a set temperature within the temperature range of between −43° C. and −20° C. by the second heat exchanger; a hydrogen cooling power for cooling hydrogen to −40° C. is between 13.5 kW and 16.5 kW; the hydrogen passage has an outlet port from which the hydrogen having been cooled by the second heat exchanger is discharged; and a flow rate of the hydrogen discharged from the outlet port is between 4.5 kg/3 minutes and 5.5 kg/3 minutes.

According to the present invention, since it is achieved that the hydrogen cooling power for cooling hydrogen down to −40° C. is between 13.5 kW and 16.5 kW, hydrogen can be cooled with high efficiency, i.e., hydrogen can be cooled in a significantly energy-saving manner.

In addition, the hydrogen is configured to be cooled to a temperature within an error span between +2° C. and −3° C. with respect to a set temperature within the temperature range of between −43° C. and −20° C. by the second heat exchanger. That is, according to the cooled-hydrogen supply station developed by the present inventors, since the cooling precision within an error span between +2° C. and −3° C. with respect to a set temperature within the temperature range of between −43° C. and −20° C. can be achieved, hydrogen can be cooled with sufficiently high efficiency and with high precision.

In addition, in the cooled-hydrogen supply station, the hydrogen passage has an outlet port from which the hydrogen having been cooled by the second heat exchanger is discharged, and that a flow rate of the hydrogen discharged from the outlet port is between 4.5 kg/3 minutes and 5.5 kg/3 minutes. Due to such a discharging flow rate of the hydrogen, supply of the hydrogen to at least one fuel cell vehicle can be completed within 3 minutes (a hydrogen capacity of a current general fuel cell vehicle is 5 kg).

In addition, the present inventors have confirmed that, in the cooled-hydrogen supply station, when the first coolant is flon and the second coolant is potassium formate solution, specifically, "cold brine" manufactured by Showa Corporation, the aforementioned respective performances can be realized.

In addition, differently from the invention disclosed in JP 5632065 B, since the air-cooled condenser is adopted instead of the water-cooled refrigeration unit, it is not necessary to use any cooling-water utility equipment. Thus, degree of freedom associated with an installation place is remarkably improved. Furthermore, with regard to the driving control of the air-cooling fan, since the inverter control based on the pressure of the first coolant from the air-cooled condenser to the first heat exchanger is adopted, the desired energy-saving effects and highly precise operation can be achieved.

BRIEF DESCRIPTION OF DRAWINGS

FIG. 5 is a table showing an example of operation state, in the cooled-hydrogen supply station according to the embodiment of the present invention, and FIG. 6 is a table showing another example of operation state, in the cooled-hydrogen supply station according to the embodiment of the present invention.

DESCRIPTION OF EMBODIMENTS

Figure 1:
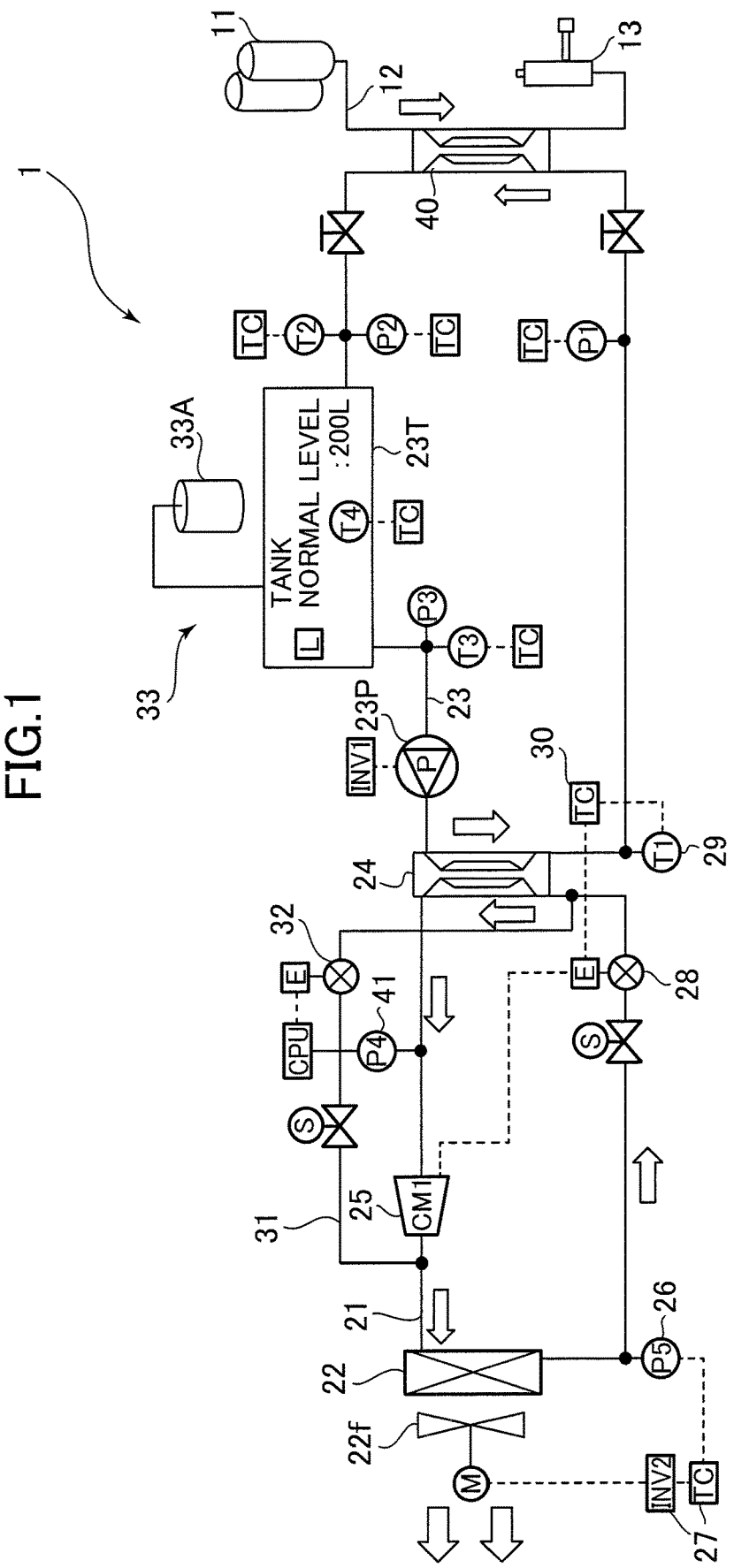
FIG. 1 is a system view of a cooled-hydrogen supply station according to an embodiment of the present invention.
Figure 2:
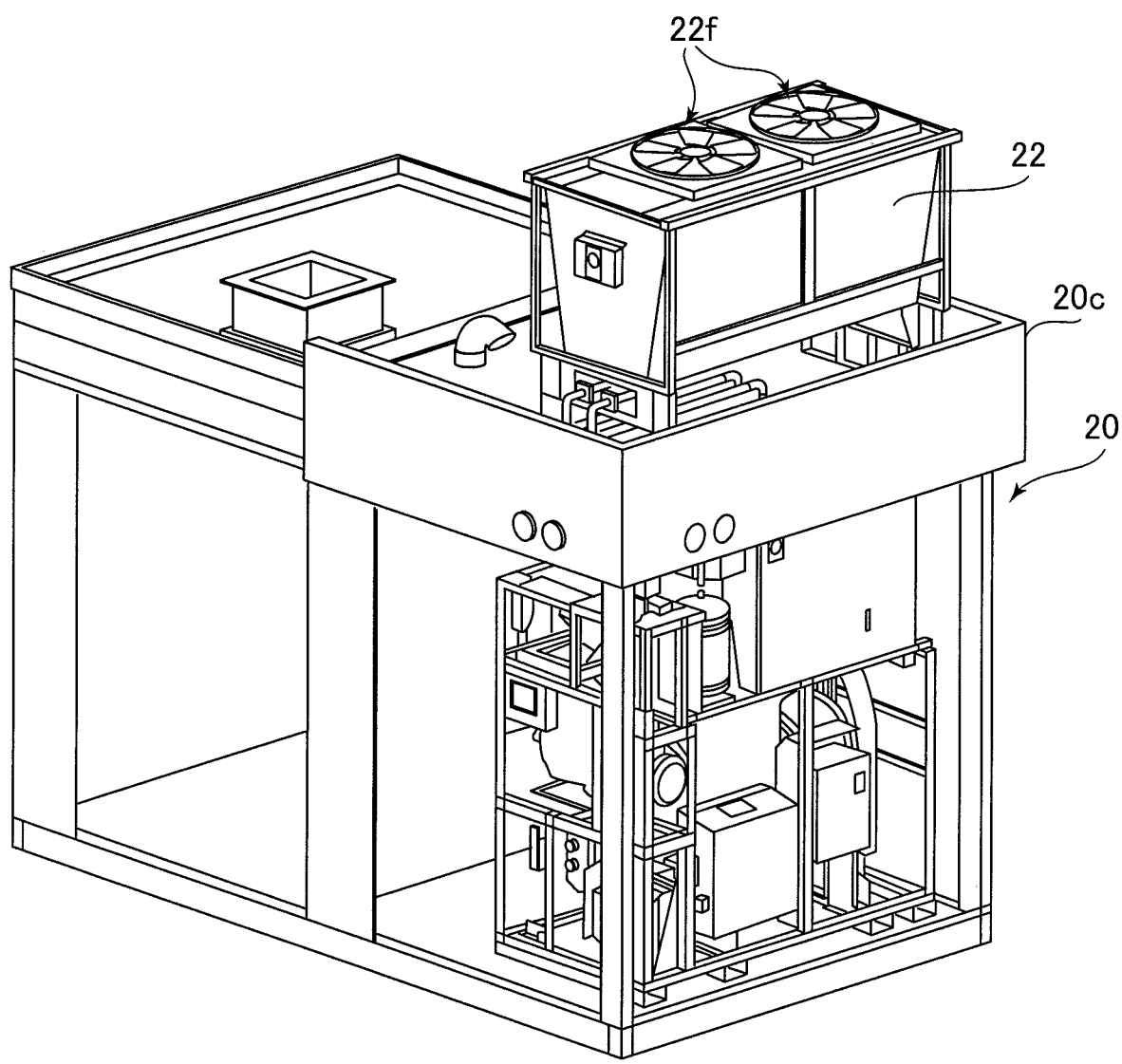
FIG. 2 is a schematic perspective view of a hydrogen cooling apparatus in the cooled-hydrogen supply station according to the embodiment of the present invention.

An embodiment of the present invention will be described below with reference to the attached drawings. FIG. 1 is a system view of a cooled-hydrogen supply station 1 according to the embodiment of the present invention. FIG. 2 is a schematic perspective view of a hydrogen cooling apparatus 2 in the cooled-hydrogen supply station 1.

As shown in FIG. 1, the cooled-hydrogen supply station 1 includes a hydrogen storage unit 11 in which hydrogen is stored, and a hydrogen passage 12 through which the hydrogen stored in the hydrogen storage unit 11 is transported. A downstream end of the hydrogen passage 12 defines an outlet port 13 (typically, a nozzle for filling). The hydrogen is supplied from the outlet port 13 to a fuel supply port of a fuel cell vehicle. When the hydrogen is supplied, the outlet port 13 and the fuel supply port of a fuel cell vehicle are air-tightly connected to each other.

Compressed hydrogen is stored in the hydrogen storage unit 11 in the present embodiment. Thus, the compressed hydrogen is supplied into the hydrogen passage 12. In the present embodiment, the hydrogen is compressed in such a manner that a rate of the hydrogen to be discharged from the outlet port 13 (a rate of hydrogen to be supplied to a fuel cell vehicle) is between 4.5 kg/3 minutes and 5.5 kg/3 minutes, in particular, 5.0 kg/3 min.

In addition, as shown in FIG. 1, the cooled-hydrogen supply station 1 includes: a first coolant passage 21 through which a first coolant circulates; a air-cooled condenser 22 disposed on a part of the first coolant passage 21 to enable cooling of the first coolant by driving an air-cooling fan; a second coolant passage 23 through which a second coolant flows; and a first heat exchanger 24 enabling cooling of the second coolant by the first coolant, between another part of the first coolant passage 21 (a part different from the part that is cooled by the air-cooled condenser 22) and a part of the second coolant passage 23.

A circulation direction of the first coolant in the first coolant passage 21 is indicated by the arrows in FIG. 1. That is, the first coolant is cooled by the air-cooled condenser 22, the first coolant then passes through the first heat exchanger 24, and the first coolant returns again to the air-cooled condenser 22. In order to circulate the first coolant in this direction, there is provided a compressor 25 at a part of the first coolant passage 21 extending from the first heat exchanger 24 to the air-cooled condenser 22.

Figure 3:
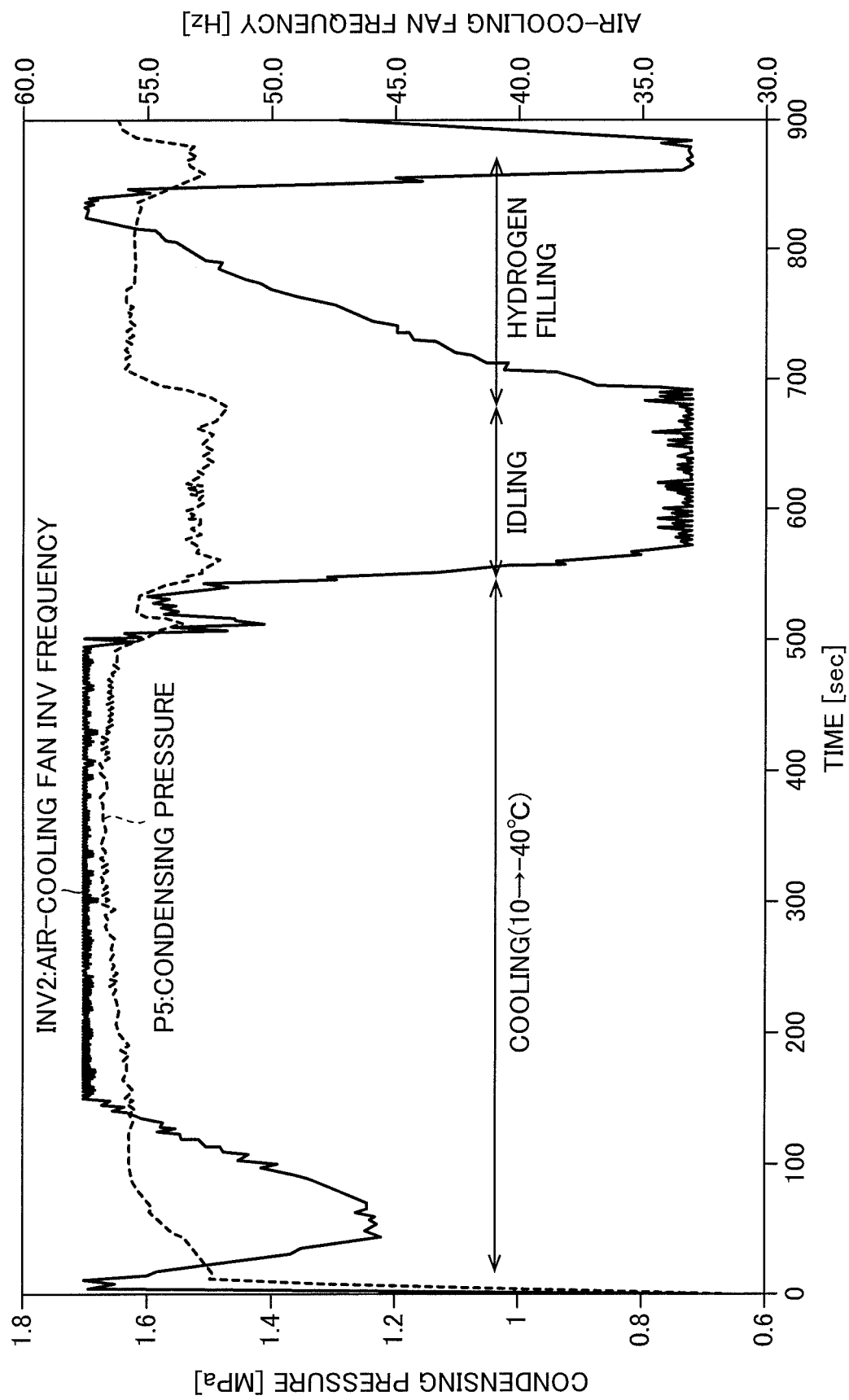
FIG. 3 is a graph showing an example of correspondence between a condensing pressure of a first coolant and a driving frequency of an air-cooling fan, in the cooled-hydrogen supply station according to the embodiment of the present invention.

In addition, there is provided a pressure detecting sensor 26 in order to detect a pressure of the first coolant (condensing pressure) at a part of the first coolant passage 21 extending from the air-cooled condenser 22 to the first heat exchanger 24. Furthermore, there is provided an inverter controller 27 configured to inverter control a driving rotational speed of the air-cooling fan 22f based on the pressure detected by the pressure detecting sensor 26 in such a manner that the pressure is maintained between 1.5 MPa and 1.7 MPa (by setting a target at 1.6 MPa). Specifically, as shown in FIGS. 3 and 5, the inverter controller 27 of the embodiment is configured to set the driving rotational speed of the air-cooling fan at 57.5 Hz while the pressure detected by the pressure detecting sensor 26 is increased or at a high level thereof (during an initial cooling of the first coolant at an initial operation and during a cooling of hydrogen by the second heat exchanger (during a filling of hydrogen)), and to maintain the driving rotational speed of the air-cooling fan at 32.9 Hz while the pressure detected by the pressure detecting sensor 26 is decreased or at a low level thereof (during an idling state).

Furthermore, there is provided an electronic expansion valve 28 between the pressure detecting sensor 26 and the first heat exchanger 24, as a valve configured to control a circulating rate of the first coolant through the air-cooled condenser 22. On the other hand, there is provided a temperature sensor configured to detect a temperature of the second coolant just after the first heat exchanger 24 in the second coolant passage 23, and there is provided a temperature feedback control unit 30 configured to control the electronic expansion valve 28 based on a detection result of the temperature sensor 29.

In addition, there are provided a hot gas bypassing passage 31 that bypasses the air-cooled condenser 22 in the first coolant passage 21, and a second valve 32 that controls a circulating rate of the first coolant through the hot gas bypassing passage 31.

In addition, a second heat exchanger 40 enabling cooling of the hydrogen by the second coolant is disposed between another part of the second coolant passage 23 (a part different from the part that is cooled by the first heat exchanger 24) and a part of the hydrogen passage 12. The second heat exchange 40 is configured to cool the hydrogen in the hydrogen passage 12, before the hydrogen reaches the outlet opening 13.

In the present embodiment, the second coolant passage 23 is composed of: a first half passage including the part of the second coolant passage 23 where heat is exchanged between the part of the second coolant passage 23 and the other part of the first coolant passage 21 by the first heat exchanger 24; a second half passage including the other part of the second coolant passage 23 where heat is exchanged between the other part of the second coolant passage 23 and the part of the hydrogen passage 12 by the second heat exchanger 40; and a tank unit 23T connecting the first half passage and the second half passage.

The tank unit 23T is substantially fully filled with the second coolant. Due to a pump 23p (not shown) provided on the first half passage, as shown in the arrows in FIG. 1, the second coolant, which has been supplied from the tank unit 23T to the first half passage, flows through the first heat exchanger 24 so as to be cooled by the first coolant, and then flows into the second haft passage. The second coolant which has been supplied to the second half passage flows through the second heat exchanger 40 to cool the hydrogen (so that the second coolant is heated), and then returns to the tank unit 23T. In the present embodiment, an operation of the pump 23 is controlled in such a manner that a flow rate of the second coolant is between 135 L/min@0.3 Mpa and 165 L/min@0.3 Mpa (i.e., between 135 L/min and 165 L/min at a flow pressure of 0.3 Mpa), in particular, 150 L/min@0.3 Mpa (i.e., 150 L/min at a flow pressure of 0.3 Mpa). Specifically, the operation of the pump 23 is feedback-controlled based on flow rate values (detection result) detected by flow rate sensors (not shown) that are suitably disposed.

Figure 4:
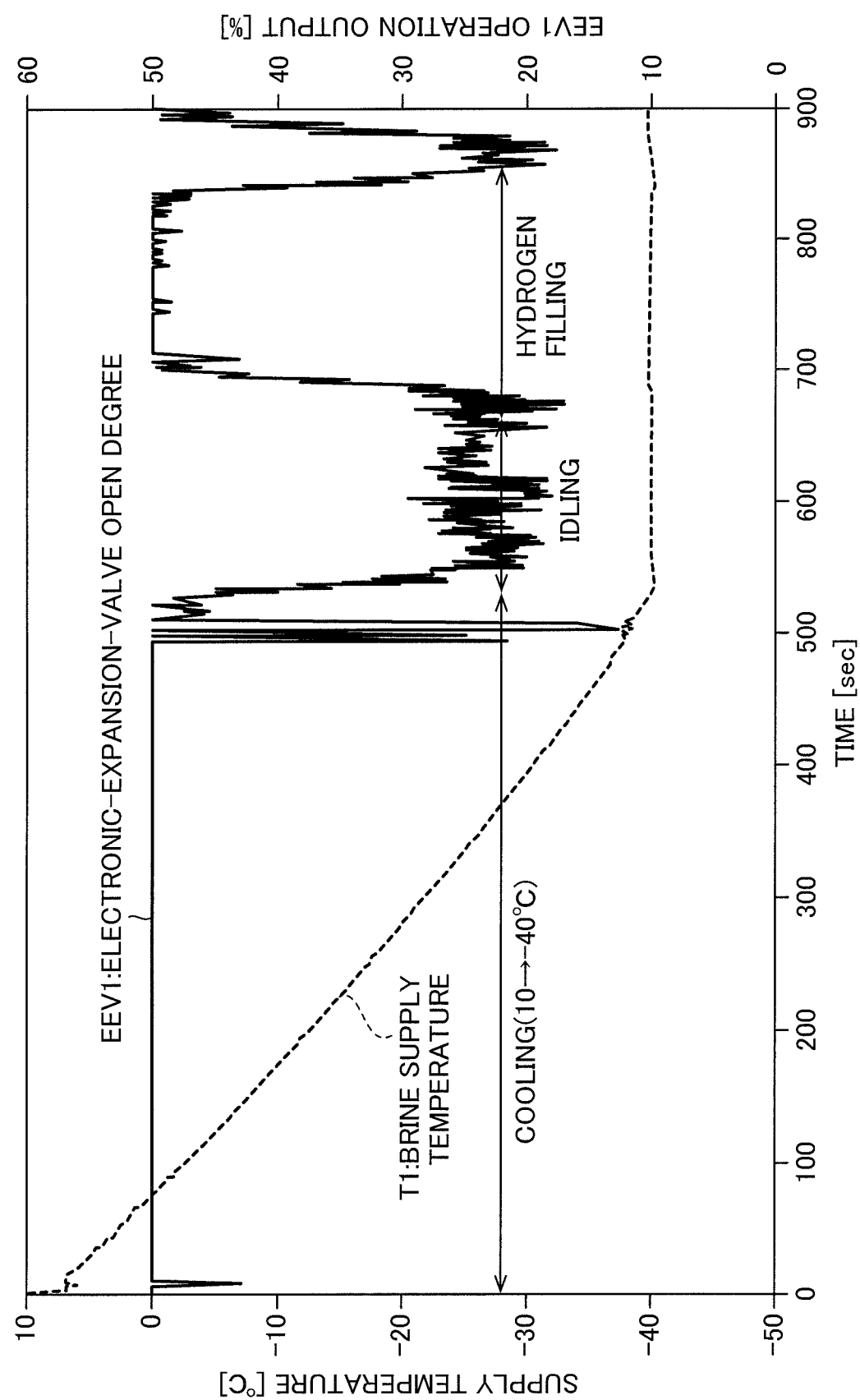
FIG. 4 is a graph showing an example of correspondence between a temperature of a second coolant and an open degree of an electronic expansion valve, in the cooled-hydrogen supply station according to the embodiment of the present invention.

In addition, the hydrogen in the hydrogen passage 12 is configured to be adjusted to a set temperature within a temperature range of between −43° C. and −20° C. via the second heat exchange 40, by adjusting a temperature of the second coolant flowing through the second heat exchanger 40 by means of any control of the electronic expansion valve 28 or the like. Specifically, as shown in FIG. 4, a feedback control is carried out based on a temperature value (detection value) of the second coolant detected by the temperature sensor 29, in such a manner that when the temperature of the second coolant is higher than −40° C., an open degree of the electronic expansion valve 28 during the operation is 40% or more, and an upper limit thereof is for example 50%, and that when the temperature of the second coolant is not higher than −40° C., a lower limit of the open degree of the electronic expansion valve 28 during the operation is 10%, and for example the open degree of the electronic expansion valve 28 during the operation is between 20% and 30%.

Herein, in the present embodiment, flon is used as the first coolant circulating in the first coolant passage 21. Specifically, there is used HFC-based mixture coolant R404A manufactured by Du Pont-Mitsui Fluorochemicals Co., Ltd. Meanwhile, cold brine FP-40 (potassium formate solution) manufactured by Showa Corporation is used as the second coolant flowing in the second coolant passage 23.

The cold brine FP-40 serving as the second coolant is a liquefied coolant, and is capable of holding flowability within a temperature range of between −43° C. and −20° C. Further, the cold brine FP-40 serving as the second coolant may expand or contract depending on a temperature thereof. When the second coolant expands or contracts, a liquid level of the second coolant in the tank unit 23T rises or falls, which might cause corrosion thereof. However, in the present embodiment, in order to prevent this corrosion, a coolant-amount regulating mechanism 33 configured to maintain a liquid level of the second coolant in the tank unit 23T within a predetermined range (preferably at a predetermined liquid level height) is connected to the tank unit 23T. The coolant-amount regulating mechanism 33 has a regulating tank 33A and a check valve (not shown) that are connected to the tank unit 23T. When the second coolant is cooled to contract, the coolant-amount regulating mechanism 33 is configured to replenish the second coolant from the regulating tank 33A into the tank unit 23T, so as to maintain the liquid level of the second coolant within the predetermined range. On the other hand, when the second coolant is heated to expand, the coolant-amount regulating mechanism 33 is configured to discharge the second coolant from the tank unit 23T through the check valve so as to maintain the liquid level of the second coolant within the predetermined range.

In FIG. 1, the hydrogen storage unit 11 and the hydrogen passage 12 passing through the second heat exchanger 40 constitute a hydrogen supply dispenser 10 in the cooled-hydrogen supply station 1. On the other hand, a part of the cooled-hydrogen supply station 1, other than the hydrogen storage unit 11 and the hydrogen passage 12, can be understood as a hydrogen cooling apparatus 20. The cooled-hydrogen supply station 1 is formed by combining the hydrogen supply dispenser 10 and the hydrogen cooling apparatus 20 via the second heat exchanger 40.

Herein, as shown in FIG. 2, it is necessary to dispose the air-cooling fan 22f in a state wherein the air-cooling fan 22f is exposed to an outside gas. Thus, the air-cooling fan 22f has to have an explosion-proof type of structure against hydrogen. As an example of the explosion-proof type of structure against hydrogen, there is an improved explosion resistance (safety-increased explosion proof) as an explosion-proof electrical equipment standard which can be used in a danger zone where hydrogen exists.

In the aforementioned cooled-hydrogen supply station 1, the air-cooled condenser 22 is used, and by suitably selecting the plurality of coolant passages and the respective coolants circulating through these coolant passages, the cooled-hydrogen supply station 1 can achieve a hydrogen cooling power of 13.5 kW to 16.5 kW for cooling hydrogen down to −40° C. (13.5 kW@−40° C. to 16.5 kW@−40° C.). That is, a power between 13.5 kW and 16.5 kW can be achieved as a cooling performance to maintain the hydrogen at −40° C. Further, a cooling precision within an error span between +2° C. and −3° C. with respect to a set temperature within the temperature range of between −43° C. and −20° C. can be achieved.

In addition, the cooled-hydrogen supply station 1 according to the present embodiment can be operated by selecting any of a first operation mode and a second operation mode. In the first operation mode, the hydrogen is cooled to −20° C. Meanwhile, in the second operation mode, the hydrogen is cooled to −40° C. The selection of the first operation mode or the second operation mode is automatically carried out depending on a time zone. For example, in the present embodiment, the first operation mode is selected from 5:00 pm to 9:00 am, and the second operation mode is selected in a time zone other than between 5:00 pm to 9:00 am.

In addition, in the present embodiment, setting of a time zone in which the first operation mode is selected and a time zone in which the second operation mode is selected can be manually changed. Specifically, as shown in FIG. 2, a housing 20C of the hydrogen cooling apparatus 20 can be provided with a touch panel so that an operator can manually operate the touch panel.

Furthermore, the selection itself of the first operation mode or the second operation mode may be manually carried out through the touch panel or the like. Alternatively, the selection of the first operation mode or the second operation mode may be automatically carried out in response to an outside air temperature.

Next, an operation of the hydrogen supply station 1 according to the present embodiment is explained.

The hydrogen supply station 1 according to the present embodiment is operated by selecting the first operation mode in which the hydrogen is cooled to −20° C. or the second operation mode in which the hydrogen is cooled to −40° C.

An operation of the hydrogen supply station 1 in the first operation mode is explained firstly. Upon start of the operation in the first operation mode, the compressor 25 of the first coolant passage 21 is driven so that the first coolant in the first coolant passage 21 is started to circulate in the direction of the arrows in FIG. 1. In addition, the pump 23p of the second coolant passage 23 is driven so that the second coolant is started to circulate in the direction of the arrows in FIG. 1. Thus, the first coolant circulating in the first coolant passage 21 passes through the first heat exchanger 24, and the second coolant circulating in the second coolant passage 23 passes through the first heat exchanger 24. At this time, the second coolant is cooled by the first coolant through the first heat exchanger 24. Subsequently, the second coolant flows through the second heat exchanger 40 of the second half passage of the second coolant passage 23, and then returns to the tank unit 23T.

The temperature of the second coolant, which has passed through the first heat exchanger 24 is detected by the temperature sensor 29. The feedback control unit 30 controls the electronic expansion valve 28 of the first coolant passage 21, if needed, depending on a difference between the temperature of the second coolant, which has been detected by the temperature sensor 29, and −20° C. Thus, the temperature of the second coolant is controlled at −20° C.

Next, an operation of the hydrogen supply station 1 in the second operation mode is explained. Upon start of the operation in the second operation mode as well, the compressor 25 of the first coolant passage 21 is driven so that the first coolant in the first coolant passage 21 is started to circulate in the direction of the arrows in FIG. 1. In addition, the pump 23p of the second coolant passage 23 is driven so that the second coolant is started to circulate in the direction of the arrows in FIG. 1. Thus, the first coolant circulating in the first coolant passage 21 passes through the first heat exchanger 24, and the second coolant circulating in the second coolant passage 23 passes through the first heat exchanger 24. At this time, the second coolant is cooled by the first coolant through the first heat exchanger 24. Subsequently, the second coolant flows through the second heat exchanger 40 of the second half passage of the second coolant passage 23, and then returns to the tank unit 23T.

The temperature of the second coolant, which has passed through the first heat exchanger 24 is detected by the temperature sensor 29. The feedback control unit 30 controls the electronic expansion valve 28 of the first coolant passage 21, if needed, depending on a difference between the temperature of the second coolant, which has been detected by the temperature sensor 29, and −40° C. (see FIG. 4). Thus, the temperature of the second coolant is controlled at −40° C.

In this state, a hydrogen filling operation is started. That is, the hydrogen in a compressed state is supplied from the hydrogen storage unit 11 through the hydrogen passage 12 to the outlet port 13 (and to a fuel cell vehicle). At this time, the hydrogen through the hydrogen passage 12 is precisely cooled down to −40° C. by the second coolant through the second heat exchanger 40. In addition, at this time, the flow rate of the circulating second coolant is between 135 L/min@0.3 Mpa and 165 L/min@0.3 Mpa, in particular, 150 L/min@0.3 Mpa.

After flowing through the second heat exchanger 40 so as to have a higher temperature, the second coolant returns to the tank unit 23T. The temperature of the second coolant is detected by the temperature sensor 29, and the open degree of the electronic expansion valve 28 is controlled by the temperature feedback control unit 30 based on the detected temperature (see FIG. 4). Thus, the temperature of the second coolant circulating in the second half passage can be stably maintained at −40° C.

In fact, according to the cooled-hydrogen supply station 1 developed by the present inventors, the second coolant can be cooled with high precision to a temperature with an error span between +2° C. and −3° C. Thus, the hydrogen cooled by the second coolant can be also cooled with high precision to a temperature with an error span between +2° C. and −3° C.

According to the second operation mode in the present embodiment, it takes 120 minutes for the second coolant that has been at an external temperature of +40° C., for example, to be cooled to −40° C. In addition, it takes only 30 minutes for the second coolant that has been cooled at −20° C. in the first operation mode to be further cooled to −40° C.

The cooled-hydrogen supply station 1 in the present embodiment can supply the hydrogen, which has been cooled with high precision as described above, to a fuel cell vehicle at a flow rate of between 4.5 kg/3 minutes and 5.5 kg/3 minutes, in particular, 5.0 kg/3 minutes. In addition, according to the cooled-hydrogen supply station 1 in the present embodiment, after the hydrogen has been supplied to a certain fuel cell vehicle at a flow rate of between 4.5 kg/3 minutes and 5.5 kg/3 minutes, in particular, 5.0 kg/3 minutes, another succeeding fuel cell vehicle can be supplied with hydrogen, after an interval of only 7 minutes, at the same flow rate of between 4.5 kg/3 minutes and 5.5 kg/3 minutes, in particular, 5.0 kg/3 minutes.

A cooling power for stably maintaining the second coolant that has been cooled to −40° C. at the same temperature of −40° C. is between 13.5 kW@−40° C. and 16.5 kW@−40° C., in particular, 15.0 kW@−40° C.

When the first operation mode is switched to the second operation mode, the compressor 25 on the first coolant passage 21 and the pump 23p on the second coolant passage 23 may be driven continuously from the first operation mode. Similarly, when the second operation mode is switched to the first operation mode as well, the compressor 25 on the first coolant passage 21 and the pump 23p on the second coolant passage 23 may be driven continuously from the second operation mode.

In addition, in both of the first operation mode and the second operation mode, the cold brine FP-40 serving as the second coolant may expand or contract depending on a temperature thereof. In the present embodiment, even when the second coolant expands or contracts, the coolant-amount regulating mechanism 33 functions such that the liquid level of the second coolant in the tank unit 23T is maintained within a predetermined range (preferably at a predetermined liquid level height), in order to prevent that the liquid level of the second coolant in the tank unit 23T rises or falls to cause corrosion or the like. When the second coolant is cooled to contract, the coolant-amount regulating mechanism 33 replenishes the second coolant from the regulating tank 33A into the tank unit 23T, so as to maintain the liquid level of the second coolant within the predetermined range. On the other hand, when the second coolant is heated to expand, the coolant-amount regulating mechanism 33 discharges the second coolant from the tank unit 23T to the outside through the check valve, so as to maintain the liquid level of the second coolant within the predetermined range.

According to the cooled-hydrogen supply station 1 in the present embodiment, since the hydrogen cooling power of between 13.5 kW@−40° C. and 16.5 kW@−40° C. can be achieved, the hydrogen can be cooled with high efficiency, i.e., the hydrogen can be cooled in a significantly energy-saving manner.

Further, in the present embodiment, since the cooling precision within an error span between +2° C. and −3° C. with respect to a set temperature within the temperature range of between −43° C. and −20° C. can be achieved, the hydrogen can be cooled with sufficiently high efficiency and with high precision.

In addition, differently from the invention disclosed in JP 5632065 B, since the air-cooled condenser 22 is adopted instead of the conventional water-cooled refrigeration unit, it is not necessary to use any cooling-water utility equipment. Thus, degree of freedom associated with an installation place is remarkably improved. Furthermore, with regard to the driving control of the air-cooling fan 22f, since the inverter control based on the pressure of the first coolant between from the air-cooled condenser 22 to the first heat exchanger 24 is adopted, the desired energy-saving effects and highly precise operation can be achieved.

Specifically, while the pressure detected by the pressure detecting sensor 26 is increased or at a high level thereof (during an initial cooling of the first coolant at an initial operation and during a cooling of hydrogen by the second heat exchanger 40), the driving rotational speed of the air-cooling fan 22f is set at 57.5 Hz. On the other hand, while the pressure detected by the pressure detecting sensor 26 is decreased or at a low level thereof (during an idling state), the driving rotational speed of the air-cooling fan 22f is maintained at 32.9 Hz. Thereby, effective energy-saving effects can be achieved. In addition, such a control makes the condensing pressure of the first coolant stable within the range of between 1.5 MPa and 1.7 MPa, so that the first coolant can be always used in a stable state thereof (see FIG. 3).

In addition, according to the present embodiment, as shown in FIG. 4, when the temperature of the second coolant is higher than −40° C., the open degree of the electronic expansion valve 28 during the operation is 40% or more, and an upper limit thereof is for example 50%, and when the temperature of the second coolant is not higher than −40° C., a lower limit of the open degree of the electronic expansion valve 28 during the operation is 10%, and for example the open degree of the electronic expansion valve 28 during the operation is between 20% and 30%. Thereby as well, effective energy-saving effects can be achieved. In this case, the second valve 32 configured to control the circulating rate of the first coolant through the hot gas bypassing passage 31 is feed-back controlled to be opened based on a pressure value (detection value) of the first coolant detected by the pressure detecting sensor 41, in such a manner that the pressure detected by the pressure detecting sensor 41 is maintained at −46 kPa or more. Such an operation state is shown in FIG. 5.

In addition, according to the cooled-hydrogen supply station 1 in the present embodiment, the cooled-hydrogen supply station 1 is operated by selecting any of the first operation mode and the second operation mode. In the first operation mode, the hydrogen is cooled to −20° C. Meanwhile, in the second operation mode, the hydrogen is cooled to −40° C. Thus, depending on probability that the hydrogen has to be supplied, if the probability is low, the first operation mode corresponding to an idling operation condition is selected. On the other hand, if the probability is high, the second operation mode corresponding to a standby condition is selected. Thus, consumption of energy for cooling the hydrogen can be efficiently restrained.

Specifically, according to the present embodiment, the selection of the first operation mode and the second operation mode is automatically carried out depending on a time zone. In a nighttime zone where there is a low probability that the hydrogen has to be supplied (e.g., outside business hours), the first operation mode is selected, while in a daytime zone where there is a high probability that the hydrogen has to be supplied (e.g., during business hours), the second operation mode is selected. Thus, in the nighttime zone where there is a less probability that the hydrogen has to be supplied, consumption of energy for cooling the hydrogen can be efficiently restrained.

Next, FIG. 6 shows another example of operation state, which is different from FIG. 5. In the example shown in FIG. 6, when the temperature of the second coolant is higher than −40° C., the output power of the compressor 25 is reduced to 70%, the open degree of the electronic expansion valve 28 is reduced to 12.8%, and the open degree of the second valve 32 is set at 100%. According to this operation state as well, effective energy-saving effects can be achieved.

1 cooled-hydrogen supply station
10 hydrogen supply dispenser
11 hydrogen storage unit
12 hydrogen passage
13 outlet port
20 hydrogen cooling apparatus
21 first coolant passage
22 air-cooled condenser
22f air-cooling fan
23 second coolant passage
23T tank unit 24 first heat exchanger
25 compressor
26 pressure detecting sensor
27 inverter controller
28 electronic expansion valve
29 temperature sensor
30 temperature feedback control unit
31 hot gas bypassing passage
32 second valve
33 coolant-amount regulating mechanism
33A coolant-amount regulating tank
40 second heat exchanger
41 pressure detecting sensor

What is claimed is:

1. A cooled-hydrogen supply station comprising:
a first coolant passage through which a first coolant circulates;
an air-cooled condenser disposed on a part of the first coolant passage so as to enable cooling of the first coolant by driving an air-cooling fan;
a second coolant passage through which a second coolant flows;
a first heat exchanger enabling cooling of the second coolant by the first coolant, between another part of the first coolant passage and a part of the second coolant passage;
a pressure detecting sensor configured to detect a pressure of the first coolant from the air-cooled condenser to the first heat exchanger;
an inverter controller configured to inverter control a driving rotational speed of the air-cooling fan based on the pressure detected by the pressure detecting sensor in such a manner that the pressure is maintained between 1.5 MPa and 1.7 MPa;
a hydrogen storage unit in which hydrogen is stored;
a hydrogen passage through which the hydrogen stored in the hydrogen storage unit is transported; and
a second heat exchanger enabling cooling of the hydrogen by the second coolant, between another part of the second coolant passage and a part of the hydrogen passage;
wherein:
the inverter controller is configured to increase the driving rotational speed of the air-cooling fan or maintain the driving rotational speed of the air-cooling fan at a high level thereof while the pressure detected by the pressure detecting sensor is increased or at a high level thereof, and to decrease the driving rotational speed of the air-cooling fan or maintain the driving rotational speed of the air-cooling fan at a low level thereof while the pressure detected by the pressure detecting sensor is decreased or at a low level thereof;
the first coolant is flon;
the second coolant is potassium formate solution;
a flow rate of the second coolant flowing through the second coolant passage is between 135 L/min and 165 L/min at a flow pressure of 0.3 MPa;
the hydrogen is cooled down to a temperature range of between −43° C. and −20° C. by the second heat exchanger;
the hydrogen is cooled to a temperature within an error span between +2° C. and −3° C. with respect to a set temperature within the temperature range of between −43° C. and −20° C. by the second heat exchanger;
a hydrogen cooling power for cooling hydrogen to −40° C. is between 13.5 kW and 16.5 kW;
the hydrogen passage has an outlet port from which the hydrogen having been cooled by the second heat exchanger is discharged; and
a flow rate of the hydrogen discharged from the outlet port is between 4.5 kg/3 minutes and 5.5 kg/3 minutes.

2. The cooled-hydrogen supply station according to claim 1, wherein
the air-cooling fan has an explosion-proof type of structure against hydrogen.

3. The cooled-hydrogen supply station according to claim 1, further comprising:
a valve configured to control a circulating rate of the first coolant through the air-cooled condenser;
a temperature sensor configured to detect a temperature of the second coolant just after the first heat exchanger in the second coolant passage; and
a temperature feedback control unit configured to control the valve based on a detection result of the temperature sensor.

4. The cooled-hydrogen supply station according to claim 3, wherein
when the temperature of the second coolant is higher than −40° C., an open degree of the valve is between 40% to 50%, and
when the temperature of the second coolant is not higher than −40° C., the open degree of the valve is between 10% to 30%.

5. The cooled-hydrogen supply station according to claim 3, wherein
a compressor is configured to cause the first coolant to circulate through the first coolant passage, and
when the temperature of the second coolant is not higher than −40° C., an output power of the compressor is reduced to a range of between 60% and 80%.

6. The cooled-hydrogen supply station according to claim 1, wherein:
the cooled-hydrogen supply station is operated by selecting any of a first operation mode and a second operation mode;
the hydrogen is cooled to −20° C. in the first operation mode; and
the hydrogen is cooled to −40° C. in the second operation mode.

7. The cooled-hydrogen supply station according to claim 6, wherein
the selection of the first operation mode or the second operation mode is automatically carried out depending on a time zone.

8. The cooled-hydrogen supply station according to according to claim 1, wherein:
the second coolant passage further includes a tank unit; and
a coolant-amount regulating mechanism configured to maintain a liquid level of the second coolant in the tank unit within a predetermined range is connected to the tank unit.

9. A hydrogen cooling apparatus configured to cool hydrogen transported in a hydrogen passage; the hydrogen cooling apparatus comprising:
a first coolant passage through which a first coolant circulates;
an air-cooled condenser disposed on a part of the first coolant passage so as to enable cooling of the first coolant by driving an air-cooling fan;
a second coolant passage through which a second coolant flows;

a first heat exchanger enabling cooling of the second coolant by the first coolant, between another part of the first coolant passage and a part of the second coolant passage;

a pressure detecting sensor configured to detect a pressure of the first coolant from the air-cooled condenser to the first heat exchanger;

an inverter controller configured to inverter control a driving rotational speed of the air-cooling fan based on the pressure detected by the pressure detecting sensor in such a manner that the pressure is maintained between 1.5 MPa and 1.7 MPa; and a second heat exchanger enabling cooling of the hydrogen by the second coolant, between another part of the second coolant passage and a part of the hydrogen passage;

wherein:

the first coolant is flon;

the second coolant is potassium formate solution;

a flow rate of the second coolant flowing through the second coolant passage is between 135 L/min and 165 L/min at a flow pressure of 0.3, MPa;

the hydrogen is cooled down to a temperature range of between −43° C. and −20° C. by the second heat exchanger;

the hydrogen is cooled to a temperature within an error span between +2° C. and −3° C. with respect to a set temperature within the temperature range of between −43° C. and −20° C. by the second heat exchanger;

a hydrogen cooling power for cooling hydrogen to −40° C. is between 13.5 kW and 16.5 kW;

the hydrogen passage has an outlet port from which the hydrogen having been cooled by the second heat exchanger is discharged; and a flow rate of the hydrogen discharged from the outlet port is between 4.5 kg/3 minutes and 5.5 kg/3 minutes.

* * * * *